Figure 1:
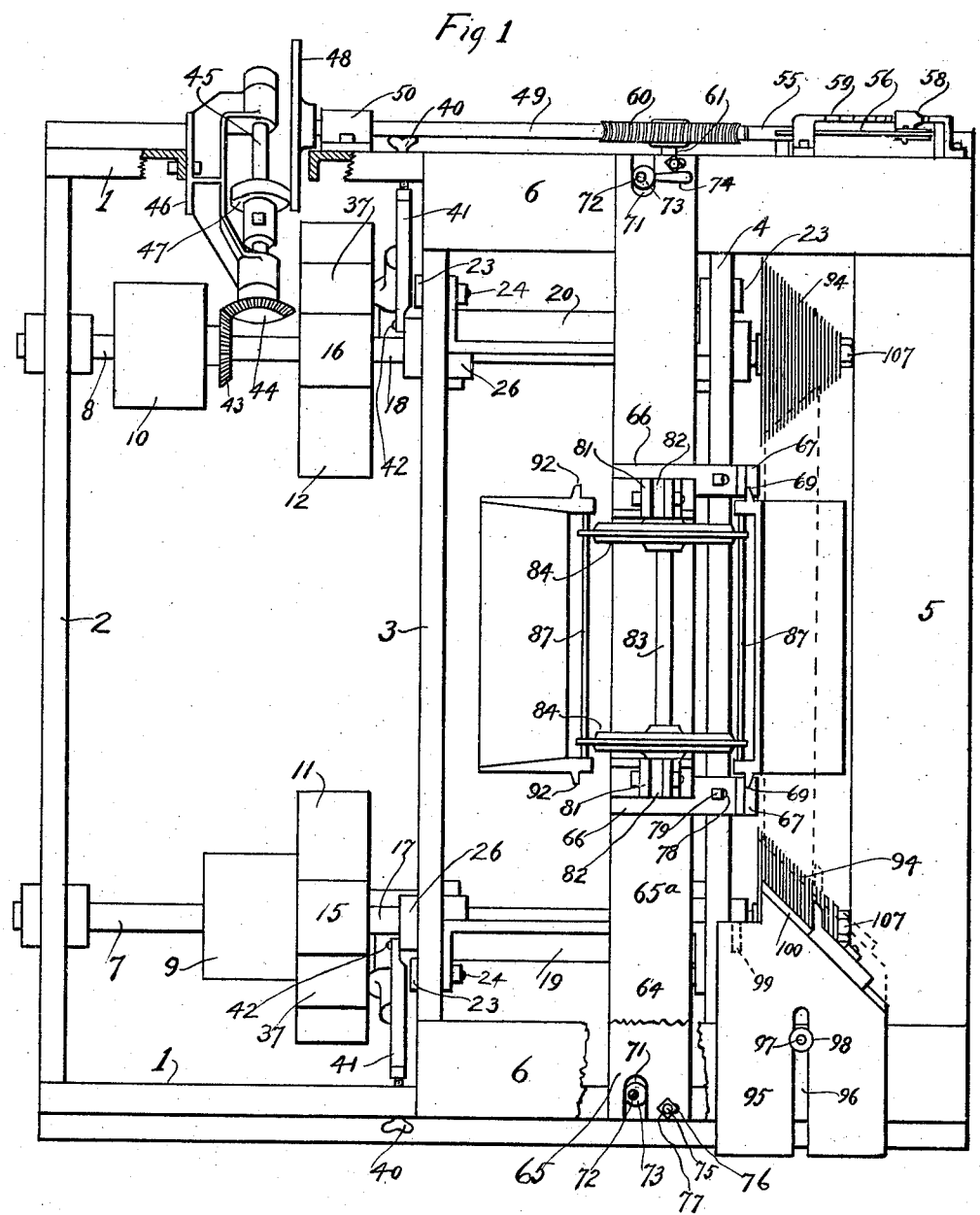

J. H. O'NEILL.
MORTISE AND TENON HOPPER JOINT MACHINE.
APPLICATION FILED JUNE 1, 1909.

987,163.

Patented Mar. 21, 1911.

6 SHEETS—SHEET 1.

WITNESSES
M. A. O'Donnell
Frank R. Elon

INVENTOR
J. H. O'Neill
By George H. Loofer, Atty.

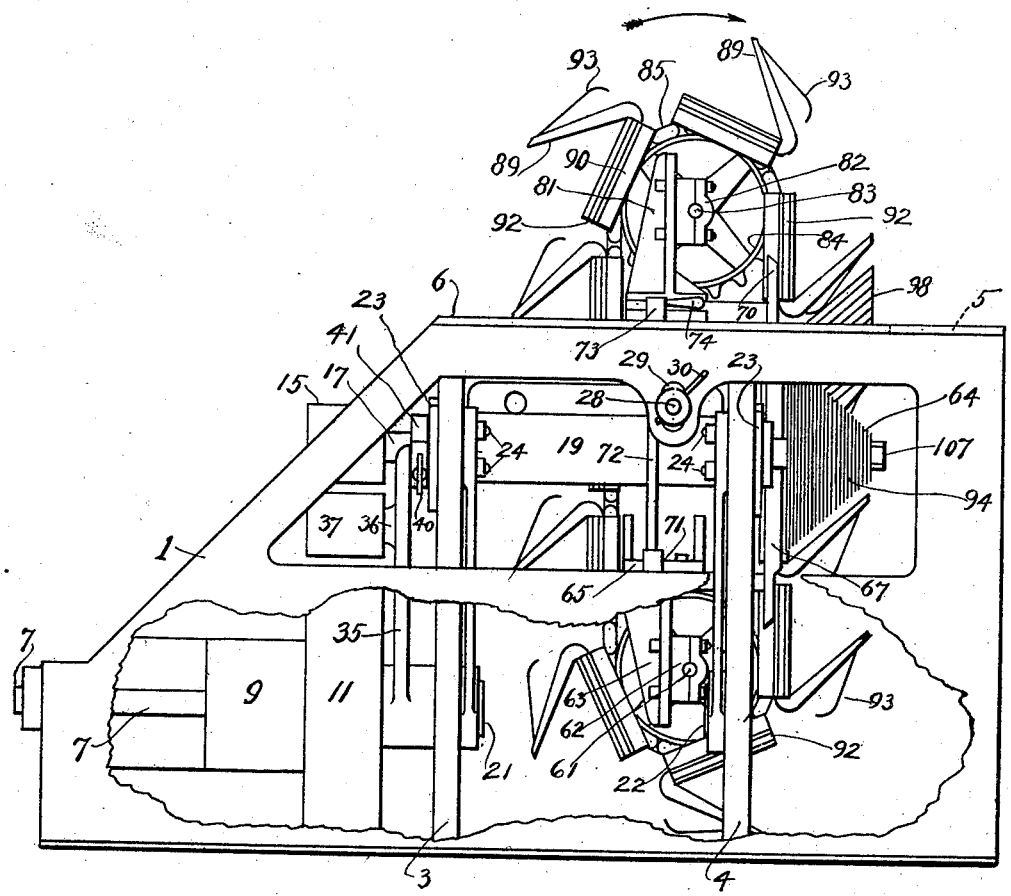

J. H. O'NEILL.
MORTISE AND TENON HOPPER JOINT MACHINE.
APPLICATION FILED JUNE 1, 1909.
987,163.
Patented Mar. 21, 1911.
6 SHEETS—SHEET 3.
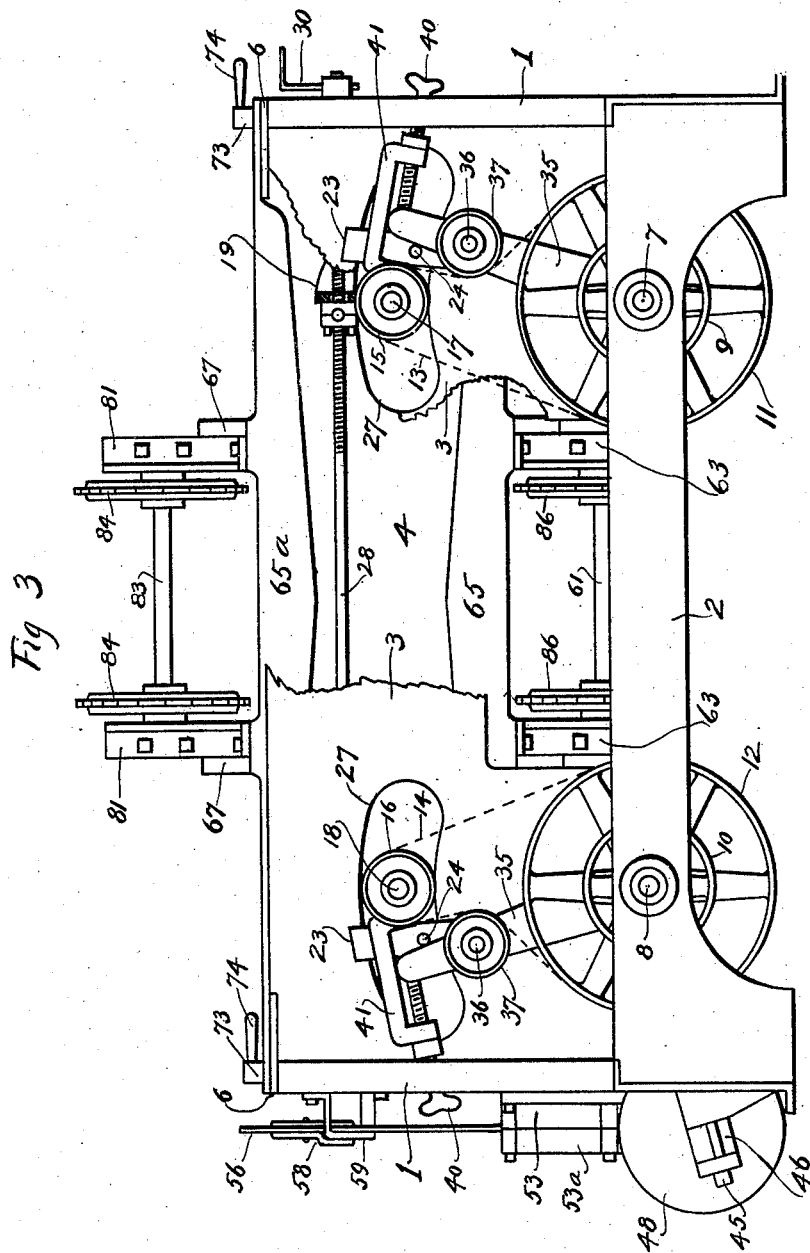
WITNESSES
M. A. O'Donnell.
Frank R. Elow
INVENTOR
J. H. O'Neill.
By George H. Stone atty.

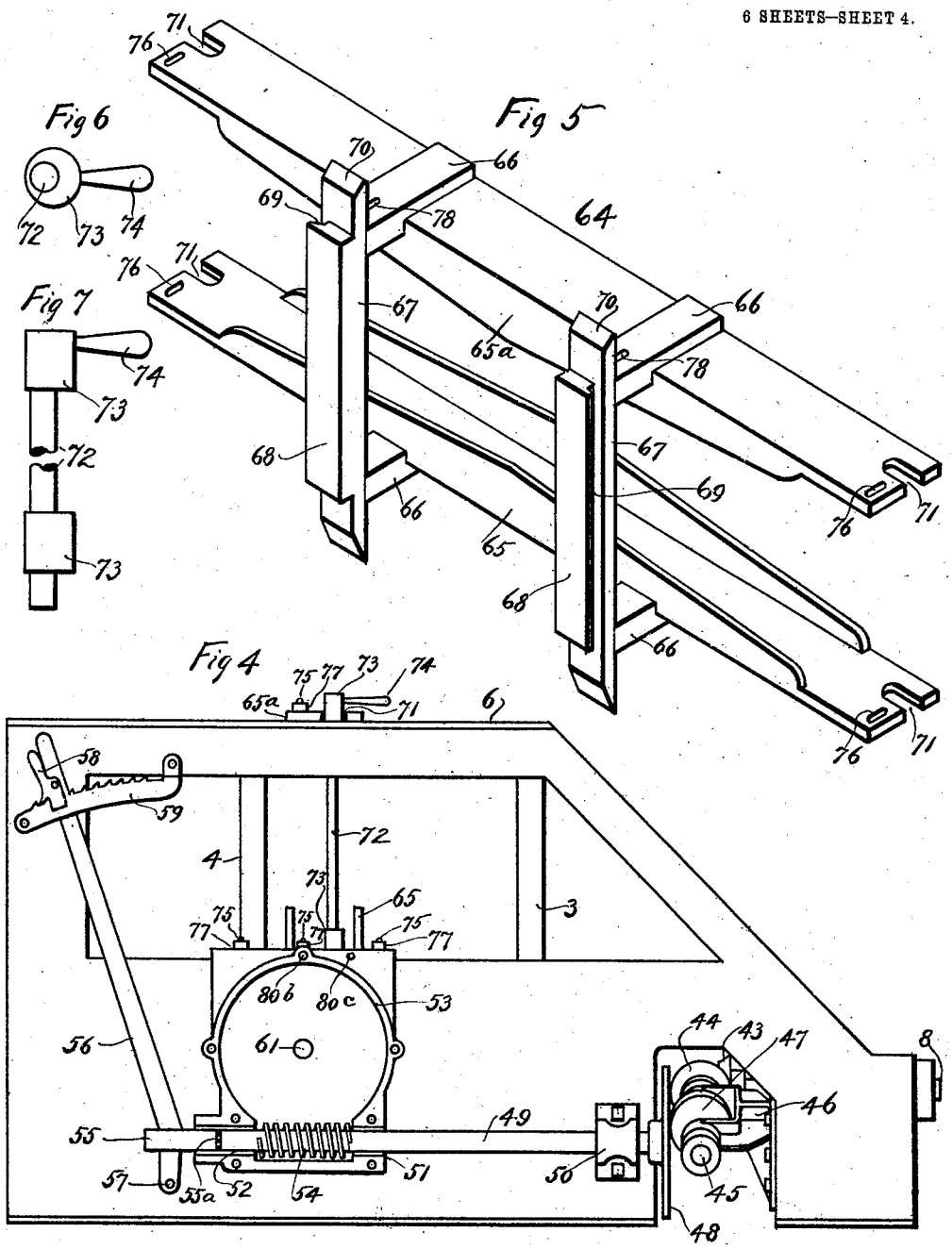

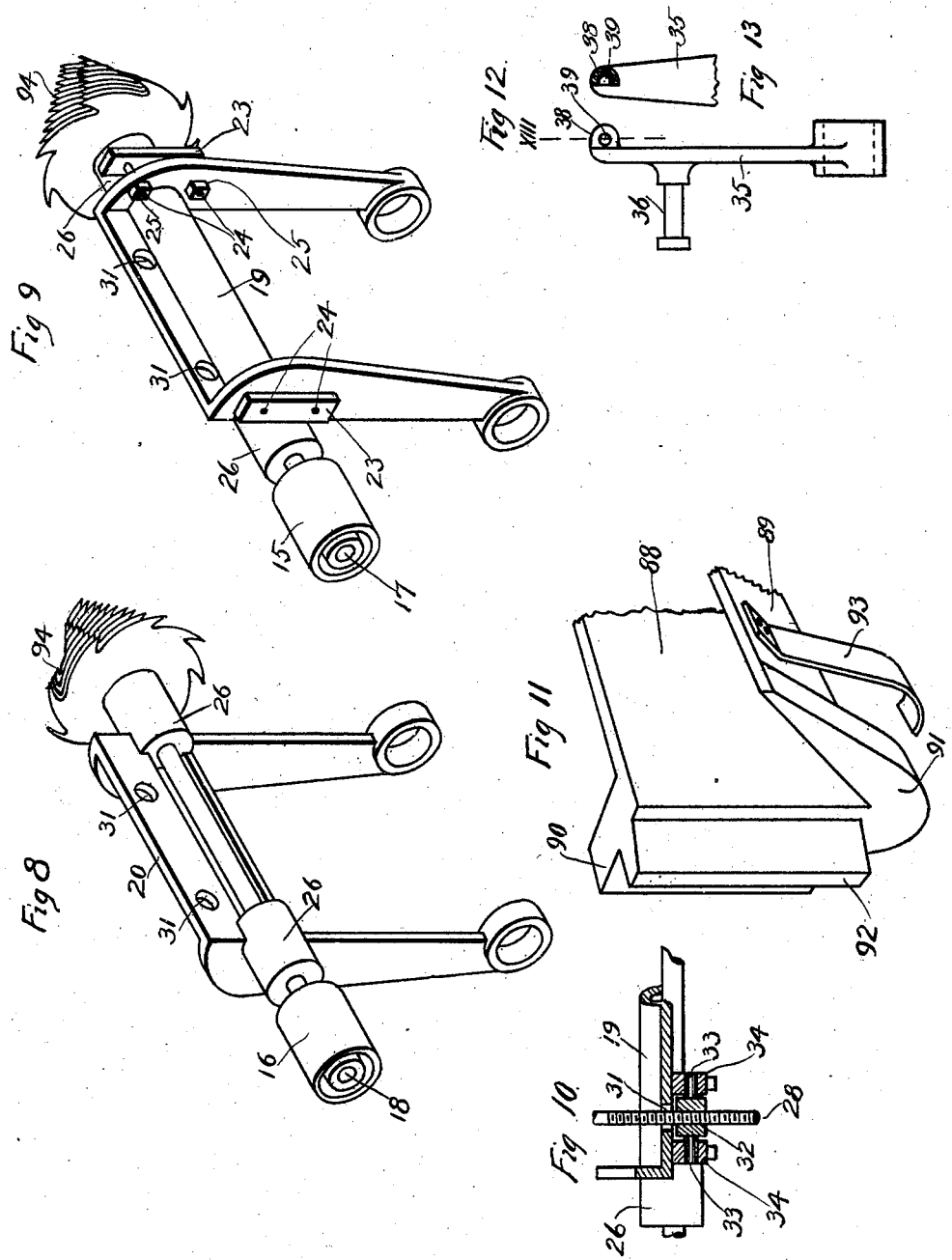

J. H. O'NEILL.
MORTISE AND TENON HOPPER JOINT MACHINE.
APPLICATION FILED JUNE 1, 1909.
987,163.
Patented Mar. 21, 1911.
6 SHEETS—SHEET 6.
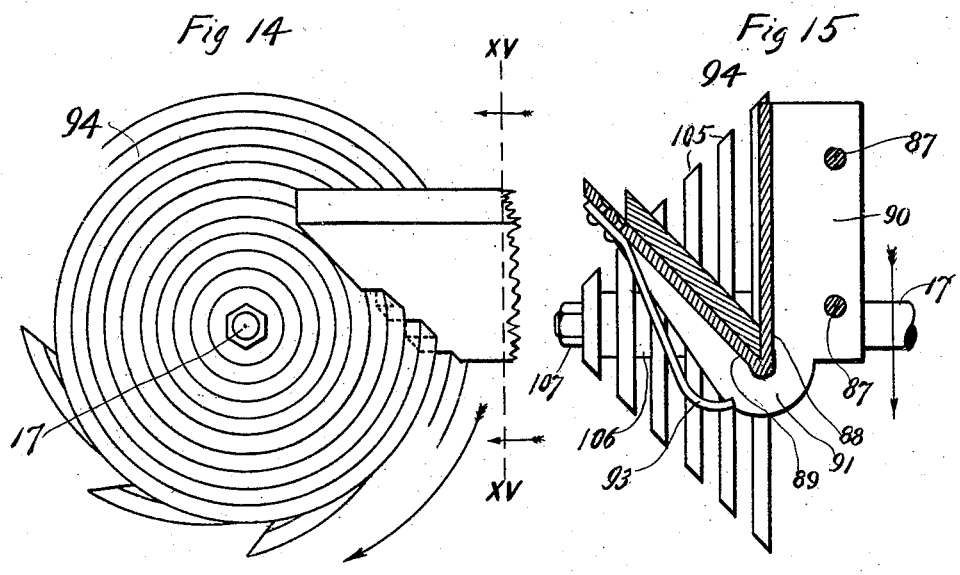
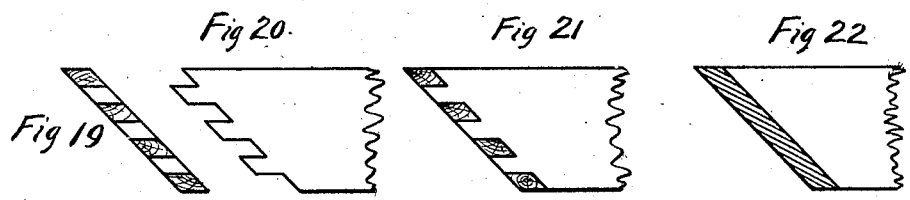
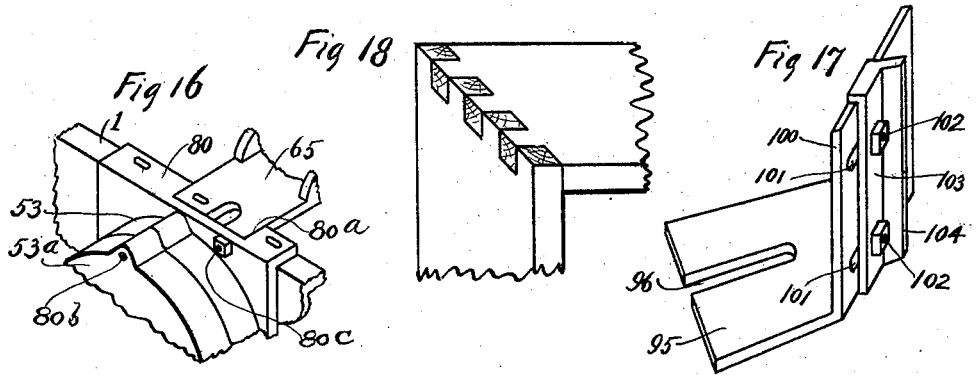
WITNESSES
M. A. O'Donnell.
Frank R. Elove
INVENTOR
J. H. O'Neill.
By George F. Thropp atty

UNITED STATES PATENT OFFICE.

JOHN H. O'NEILL, OF SPRINGFIELD, MISSOURI.

MORTISE-AND-TENON HOPPER-JOINT MACHINE.

987,163. Specification of Letters Patent. Patented Mar. 21, 1911.

Application filed June 1, 1909. Serial No. 499,609.

*To all whom it may concern:*

Be it known that I, JOHN H. O'NEILL, a citizen of the United States, residing at Springfield, in the county of Greene and State of Missouri, have invented certain new and useful Improvements in Mortise-and-Tenon Hopper-Joint Machines, of which the following is a specification.

This invention relates to mortise and tenon machines and my object is to produce a machine of the character named for making mortise and tenon joints for uniting the arms to the backs of buggy seats of the hopper type.

A further object is to produce a mortise and tenon machine which will operate efficiently and reliably and mortise and tenon boards as rapidly as the same can be supplied.

A still further object is to produce a machine of this character of simple, strong, durable and comparatively inexpensive construction.

With these objects in view and others as hereinafter appear, the invention consists in certain novel and peculiar features of construction and organization as hereinafter described and claimed; and in order that it may be fully understood reference is to be had to the accompanying drawings, in which;

Figure 1, is a top plan view of a machine embodying my invention with the worm gear case omitted and certain parts broken away to disclose features otherwise hidden. Fig. 2, is a side view partly broken away. Fig. 3, is a rear view partly broken away. Fig. 4, is a view of the opposite side from that shown in Fig. 2, with certain parts omitted. Fig. 5, is a detail perspective view of a supporting and guide frame of the machine. Fig. 6, is a top plan view, and Fig. 7, a side view, of one of the supporting and guide-frame adjusting parts of the machine. Figs. 8 and 9 are detail perspective views of the adjustable saw-carrying frames. Fig. 10, is a horizontal section showing a part of one of the saw-carrying frames and means for adjusting the same. Fig. 11, is a perspective view of a board carrier. Fig. 12, is an edge view of one of the belt-tensioning roller-carrying frames. Fig. 13, is a section on the line XIII of Fig. 12. Fig. 14, is an enlarged front view of one of the conical cutters for producing mortises and tenons in the inclined end of a board. Fig. 15, is a section on the line XV—XV of Fig. 14, and also shows an inclined traveling carrier for one or a plurality of superposed boards. Fig. 16, is a detail perspective view showing the method of connecting the worm gear case and the supporting and guide frame. Fig. 17, is a detail perspective view of an end-gage forming part of the machine. Fig. 18, is an inverted plan view of one of the rear corners of a hopper buggy seat produced by the proper assemblage of boards tenoned and mortised by the conical cutters. Fig. 19, is an end view of the back board of the seat. Fig. 20, is a side view of the rear end of one of the arms or sides of the seat. Fig. 21, is a side view of a portion of the seat. Fig. 22, is a vertical section through the back of the seat.

In the said drawings where like reference characters identify corresponding parts in all of the figures, 1 indicates the sides of the frame, 2 is a cross bar connecting the rear ends of said sides and 3 and 4 are similar vertical plates or partitions connecting said sides.

5 is a horizontal table connecting the sides 1 at their upper front corners in the plane of the shelves 6 rigid with and projecting inward from said sides.

7 and 8 are parallel shafts journaled in cross bar 2 and partition 3 and equipped respectively with belt-wheels 9 and 10 and 11 and 12. Belts 13 and 14 respectively connect belt-wheels 11 and 12 with smaller belt-wheels 15 and 16 secured rigidly on arbors 17 and 18 journaled in and carried by swing-frames 19 and 20 of inverted U-form, by preference, the rear arms of said frames being pivoted on cylindrical bosses 21 projecting forward from partition 3 and the front arms on similar bosses 22 projecting rearward from partition 4.

23 are clamp-plates spaced from the rear and front arms of the swing-frames, said plates being carried by bolts 24 extending through said arms and engaged at the inner sides of the latter by clamping nuts 25, for a purpose which hereinafter appears.

26 are bosses rigid with and projecting from the swing-frames through arcuate slots 27 extending concentrically with respect to shafts 7 and 8, the clamp-plates being adapted to be clamped against partitions 3 and 4 to secure the swing-frames at the desired points of adjustment.

28 is a screw-rod extending transversely of the machine and through vertical slots 29 in the sides 1, and provided at one end with a crank-handle 30. Said rod also extends loosely through one of a pair of holes 31 in each swing-frame and engages blocks 32 having trunnions 33 pivoted in bearings 34 rigid with the swing-frames, the said blocks accommodating the varying angles which the swing-frames assume with respect to the transverse screw-rod 28.

35 are swing-arms pivoted on partition 3 coaxially with shafts 7 and 8, and provided with rearwardly-projecting pins 36 on which are journaled wheels 37 to engage belts 13 and 14, and projecting forward from the upper end of said swing-arms 35 are lugs 38 having cavities 39 in their outer faces receiving the inner ends of adjusting screws 40 accessible through openings in the sides 1, which by preference are of skeleton construction. 41 are arms arched over the upper ends of swing-arms 35 and pivoted at 42 to bosses 26 and bearing a threaded relation with and forming a support for adjusting screws 40 so that the latter may maintain an operative relation to the tension-wheel-carrying arms and adjust the latter toward or from belts 13 and 14 respectively.

43 is a bevel gear secured on shaft 8 and meshing with a bevel gear 44 on a transverse shaft 45 journaled in a bearing-bracket 46 secured to the adjacent side 1 and preferably occupying an opening thereof, and also secured on shaft 45 is a friction wheel 47 for engagement with the face of the friction disk 48 secured on the rear end of a shaft 49 journaled in a bearing 50 and in bearings 51 and 52 of a sectional gear-housing 53 secured to the adjacent side of the frame. The shaft 49 is provided within the housing with a worm-thread 54 and at its front end said shaft is adapted to receive the thrust of a short rod 55 through the interposed balls 55ª, the said balls and the adjacent ends of the shaft and said thrust-rod 55 being confined within bearing 52.

A lever 56 fulcrumed at 57 on the adjacent side of the machine frame, extends through the thrust-rod 55 and is equipped at its upper end with a catch 58 for engagement with the teeth of a sector 59 secured to said side of the frame. By means of this lever the disk 48 is forced into engagement with the friction wheel 47 to be rotated thereby and through the worm-thread 54 of shaft 49 impart rotation to the worm-wheel 60 confined within the housing and secured on the end of a transverse shaft 61 journaled in bearings 62 (one only appearing) secured to the brackets 63 depending rigidly from the adjustable frame 64 constructed as follows; 65 and 65ª are two flanged transverse bars inverted with respect to each other. 66 are arms projecting forward from said bars and 67 are vertical bars connecting the front ends of arms 66 and formed with vertical ribs 68 at their front sides to provide guide-grooves 69 such grooves being of V-shape in cross section. The said ribs terminate by preference, short of the upper ends of bars 67 and said ends of the latter are preferably beveled downward and forward as at 70, for a purpose which hereinafter appears. The bar 65, projects at its ends into the opening of the sides 1, through which the adjusting screws 40, extend and rest upon said sides, the bar 65ª, resting at its ends upon the shelves 6 of said sides.

72 are vertical shafts journaled in the sides and said shafts are provided with eccentric enlargements 73 fitting snugly in notches 71 of bars 65 and 65ª, the uppermost enlargements 73 having handles 74 whereby said shafts are turned for the purpose of shifting the frame 64 forward or backward, and in order to guide said frame in its forward or backward movement the sides of the machine frame and shelves 6 are provided with vertical bolts 75 engaging transverse slots 76 in the bars 65 and 65ª, nuts 77 engaging the said bolts to clamp said frame against accidental movement. The upper arms 66 of frame 64 are provided with slots 78 to receive clamping-bolts 79 engaging the upper edge of partition 4 and thus assisting in guarding against any movement of frame 64.

To adapt the worm-gear-housing 53 to shift back and forth with frame 64, it is equipped with a flange 80 projecting through the opening in the adjacent side 1 of the machine frame, and provided with a notch 80ª receiving the adjacent end of bar 65, bolts 80ᵇ and 80ᶜ extending through the housing and into the end of said bar 65, as shown in Fig. 16, to secure the housing rigidly to said frame 64.

81 are brackets corresponding to brackets 63, projecting upward from bar 65ª of frame 64, and equipped with bearings 82 for a shaft 83 carrying sprocket-wheels 84 connected by sprocket chains 85 with sprocket wheels 86, on shaft 61, and said chains are connected at proper intervals by cross rods 87 and constitute an endless conveyer. A plurality of board-carriers are carried by said conveyer, each consisting of what may be termed a gage-plate 88 and a table 89, and projecting from the ends of the gage-plate in the opposite direction from the table, are flanges 90 receiving the ends of a pair of the rods 87, said flanges being formed with extensions 91 to stiffen and reinforce the table, and with outwardly-projecting tongues 92, and carried by each table at its underside is a pair of springs 93 for the purpose of exerting a downward yielding pressure upon a number of superposed boards hereinafter identified, mounted upon the underlying table and bearing at their rear edges against the vertical gage thereof.

The deposit of the piles of boards upon the tables with their longitudinal edges flush is insured by the gages of the carriers, and to insure that the ends of the boards are also flush, I provide a gage consisting of a horizontal plate 95 mounted upon one of the shelves 6, provided with a slot 96 extending transversely of the machine to receive a screw-bolt 97 carried by said shelf a clamping-nut 98 engaging the screw-bolt to clamp the gage at the desired point of adjustment. Plate 95 has a depending lug 99 to bear against the front side of partition 4 to prevent swivel movement. At its inner end the plate 95 is provided with an upwardly-projecting arm 100 parallel with the adjacent beveled or tapering end of the boards when passing downward between the cutters, and said upwardly-projecting flanged arm is provided with a pair of horizontal slots 101 through which extend bolts 102 to adjustably secure on said slanted arm a gage-plate 103 provided with an inwardly-projecting flange 104 to fit against the front edge of the board or pile of boards, said plate 103 being adjustable to accommodate the width of the board or boards. To place a pile of boards on a downwardly-moving table, they are first fitted against arm 100 to insure that their ends are flush with each other, the flange 104 engaging their front edges and the gage of the carrier their rear edges. As this is accomplished the boards are released and they fall upon the table and are caused to slant thereby transversely of the axes of the arbors of the cutters.

In operation the conveyer travels in the direction indicated by the arrow, Fig. 2, and as the board-carriers pass downward at the front side of sprocket wheels 84, they are deflected outward by contact with the beveled upper ends 70 of bars 67 and their outwardly-projecting tongues enter and slide downward through the grooves 69 of bars 67 so that it will be impossible for the carriers to move or sway back or forth while passing downward between the conical cutters 94 mounted on the front ends of the arbors 17 and 18, each of said cutters consisting of a series of circular saws 105 spaced equal distances apart by washers 106 on said arbors and clamped rigidly together by nuts 107 engaging the front ends of the arbors.

Assuming that the machine has been properly adjusted and is in operation, the attendant places a sufficiently large pile of boards upon each table as it attains a position in its downward movement just above the cutters, to press the springs 93 of the overlying or following table toward the bottom of the latter so that the pressure of such springs shall be utilized in assisting in holding the boards firmly together, it will be understood that the ends of the boards are beveled forwardly to correspond with the taper of the conical cutters and in length exceed the distance between said cutters by twice the depth of the mortises and tenons to be simultaneously produced by the cutters in the ends of the boards as they pass downward between the cutters, and in this connection it will be noticed that the boards are disposed at the same angle as the upper faces of the downwardly-moving tables, which angle determines the pitch or inclination of the back and arms of the hopper buggy-seat when completed. It will be further noticed that by this arrangement the mortises are cut longitudinally of the boards and at an angle to the tables so that the upper and lower sides of the tenons shall occupy horizontal planes when the boards are assembled together to form the back and arms of such hopper buggy-seat. As the carriers successively pass under the sprocket-wheels 86, their piles of boards are automatically relieved of the pressure of the springs, and slide forwardly off the tables and preferably upon an endless conveyer (not shown) traveling with sufficient speed to prevent the pile from one table dropping upon that discharged from the preceding table. One-half of the total number of boards thus mortised and tenoned at both ends are cut in half to produce arms mortised and tenoned at their rear ends for engagement with the ends of the remaining boards to form the hopper buggy-seat.

To arrest the board-carrying conveyer, the attendant trips the catch 58 of lever 56 from engagement with the sector 59, this action permitting the friction wheel 47 to force the friction-disk 48 and its shaft 49 forwardly, the lever swinging in the same direction under the thrust imposed by shaft 49 on thrust-rod 55, worm-wheel 60 turning sufficiently to accommodate such forward movement of shaft 49. The reverse operation of the lever reëstablishes the connection between friction-disk 48 and friction-wheel 47. To accommodate boards of varying width and to so adjust them as to produce a mortise or tenon at their bottom edges, the nuts 77 are unscrewed slightly to permit the handles 74 to be turned and the eccentric enlargements to adjust frame 64 and the boards movable therewith, forward or backward, said nuts being then turned to clamp said frame in its new position. To accommodate boards of varying length, crank-handle 30 is turned in one direction or the other to cause the swing-frames 19 and 20 to move toward or from each other, it being unnecessary to turn adjusting-screws 40 because the tension-wheels 37 swing from the same centers as the swing-frames.

From the above description it will be apparent that I have produced a mortise and tenon machine embodying the features of advantage enumerated in the statement of the object of the invention and I wish it to be understood that changes may be made in the form, proportion, detail construction and arrangement without departing from the spirit and scope of the appended claims.

Having thus described the invention what I claim as new and desire to secure by Letters-Patent, is:

1. In a mortise and tenon hopper joint machine, a suitable frame, a pair of parallel arbors, conical cutters on said arbors, an endless conveyer between said arbors, slanted carriers carried by said conveyer and springs secured to the backs of the carriers for the purpose of pressing shooks of boards upon the following carriers, firmly against the faces of such carrier.

2. In a mortise and tenon hopper joint machine, a suitable frame, a pair of parallel arbors, conical cutters on said arbors, an endless conveyer between said arbors, slanted carriers carried by said conveyer and flat springs extending transversely of and below said carriers and attached at their outer ends to the carriers and spaced at their inner ends from the carriers.

3. In a machine of the character described, a suitable frame, a pair of parallel arbors, conical cutters on said arbors, a conveyer provided with a plurality of carriers to carry boards between and extending at right angles to the arbors and slanted transversely to the plane of the axes of the arbors; said carriers comprising gage-plates and tables disposed at an acute angle to each other, and a plurality of springs secured to the underside of the table of each carrier, for the purpose set forth.

4. In a mortise and tenon hopper joint machine, a suitable frame, a pair of parallel arbors, conical cutters on said arbors, means for conveying one or more boards between and extending at right angles to the arbors and slanted transversely to the plane of the axes of the said arbors, a pair of swing-frames in which said arbors are journaled, means to swing said frames to dispose the arbors nearer to or farther apart from each other, and means to clamp said swing-frames rigidly to the frame.

5. In a mortise and tenon hopper joint machine, a suitable frame, a pair of parallel arbors, conical cutters on said arbors for producing mortises and tenons, means for conveying one or more boards between and extending at right angles to the arbors and slanted transversely to the plane of the axes of said arbors, and an end-gage carried by the frame to be slidingly engaged by the end of the board or boards movable with said conveyer.

6. In a mortise and tenon hopper joint machine, a suitable frame, a pair of parallel arbors, conical cutters on said arbors for producing mortises and tenons, means for conveying one or more boards between and extending at right angles to the arbors and slanted transversely to the plane of the axes of said arbors, an end-gage carried by the frame to be slidingly engaged by the end of the board or boards movable with said conveyer, and an adjustable gage carried by the first-named gage and adapted to be slidingly engaged by the outer edge of such board or boards.

7. In a mortise and tenon hopper joint machine, a suitable frame, a pair of parallel arbors, conical cutters on said arbors consisting of series of spaced saws of gradually diminishing diameter toward the front ends of the arbors, an endless conveyer provided with a plurality of carriers to carry boards between and extending at right angles to the arbors and slanted transversely to the plane of the axes of the arbors; each carrier comprising a gage-plate and table disposed at an acute angle to each other, an end-gage to be slidingly engaged by an end of said board in its passage between the cutters, and an adjustable gage to be slidably engaged by the front edge of said board in such passage.

In testimony whereof I affix my signature, in the presence of two witnesses.

JOHN H. O'NEILL.

Witnesses:
HELEN C. RODGERS,
G. Y. THORPE.

---

Copies of this patent may be obtained for five cents each, by addressing the "Commissioner of Patents, Washington, D. C."